United States Patent
Stolitzka

(10) Patent No.: US 10,593,248 B2
(45) Date of Patent: Mar. 17, 2020

(54) METHOD AND APPARATUS FOR A SINK DEVICE TO RECEIVE AND PROCESS SUB-SAMPLED PIXEL DATA

(71) Applicant: Samsung Display Co., Ltd., Yongin-si, Gyeonggi-do (KR)

(72) Inventor: Dale F. Stolitzka, Los Altos, CA (US)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 15/890,286

(22) Filed: Feb. 6, 2018

(65) Prior Publication Data

US 2018/0227540 A1  Aug. 9, 2018

Related U.S. Application Data

(60) Provisional application No. 62/456,034, filed on Feb. 7, 2017.

(51) Int. Cl.
| | | |
|---|---|---|
| *G09G 3/20* | (2006.01) | |
| *G09G 5/00* | (2006.01) | |
| *G09G 5/04* | (2006.01) | |
| *G09G 5/02* | (2006.01) | |
| *G06F 3/14* | (2006.01) | |
| *H04N 9/64* | (2006.01) | |

(52) U.S. Cl.
CPC ............ *G09G 3/2003* (2013.01); *G06F 3/14* (2013.01); *G09G 3/2074* (2013.01); *G09G 3/2092* (2013.01); *G09G 5/005* (2013.01); *G09G 5/02* (2013.01); *G09G 5/04* (2013.01); *H04N 9/64* (2013.01); *G09G 2300/0452* (2013.01); *G09G 2340/02* (2013.01); *G09G 2340/0478* (2013.01); *G09G 2370/10* (2013.01)

(58) Field of Classification Search
None
See application file for complete search history.

(56) References Cited

U.S. PATENT DOCUMENTS

| | | |
|---|---|---|
| 7,352,374 B2 | 4/2008 | Brown Elliott et al. |
| 8,189,681 B1 | 5/2012 | Thiffault et al. |
| | (Continued) | |

FOREIGN PATENT DOCUMENTS

| | | |
|---|---|---|
| EP | 0244978 A2 | 11/1987 |
| KR | 10-2008-0043996 A | 5/2008 |

OTHER PUBLICATIONS

Anonymous: "PenTile RGBG matrix technology explained," OLED-info: The OLED Experts, www.oled-info.com, Oct. 5, 2014, XP055211594, 9 pages, Retrieved from the Internet: URL:https://web.archive.org/web/20141005184812/http://www.oled-info.com/pentile.

(Continued)

*Primary Examiner* — Yanna Wu
(74) *Attorney, Agent, or Firm* — Lewis Roca Rothgerber Christie LLP

(57) ABSTRACT

A display system including a sub-pixel formatted display is disclosed. A source generates image data, converts the image data into sub-pixel formatted data having a first sub-pixel color order, transmits the sub-pixel formatted data to a display device including the display. The display device converts the sub-pixel formatted data into sub-pixel formatted data having a second sub-pixel color order, and applies the sub-pixel data with the second sub-pixel color order to the display.

20 Claims, 11 Drawing Sheets

(56) References Cited

U.S. PATENT DOCUMENTS

| | | | |
|---|---|---|---|
| 9,536,280 B2 | 1/2017 | Kamimura et al. | |
| 2008/0036796 A1 | 2/2008 | Lin et al. | |
| 2008/0238849 A1* | 10/2008 | Kanou | G09G 3/3611 |
| | | | 345/88 |
| 2009/0161174 A1* | 6/2009 | Takeuchi | H04N 1/0035 |
| | | | 358/474 |
| 2011/0206297 A1 | 8/2011 | Tsuda et al. | |
| 2013/0057567 A1 | 3/2013 | Frank et al. | |
| 2014/0104249 A1* | 4/2014 | Furihata | G09G 3/3674 |
| | | | 345/204 |
| 2014/0321534 A1* | 10/2014 | Su | H04N 19/136 |
| | | | 375/240.03 |
| 2015/0189109 A1 | 7/2015 | Whitby-Strevens et al. | |
| 2015/0253476 A1* | 9/2015 | Shao | G02B 5/201 |
| | | | 359/891 |
| 2016/0267828 A1 | 9/2016 | Zhang et al. | |
| 2016/0335986 A1 | 11/2016 | Bae et al. | |
| 2017/0039992 A1 | 2/2017 | Mo et al. | |

OTHER PUBLICATIONS

EPO Extended Search Report dated Jun. 22, 2018, for corresponding European Patent Application No. 18155588.9 (12 pages).

* cited by examiner

METHOD AND APPARATUS FOR A SINK DEVICE TO RECEIVE AND PROCESS SUB-SAMPLED PIXEL DATA

CROSS-REFERENCE TO RELATED APPLICATION(S)

This application claims priority to, and the benefit of, U.S. Provisional Patent Application No. 62/456,034, filed on Feb. 7, 2017, in the United States Patent and Trademark Office, the entire contents of which is incorporated herein by reference.

BACKGROUND

Pixels in color displays typically include a red pixel, a green pixel, and a blue pixel, and use combinations of the red, green, and blue pixel emissions to emit light at various colors. For example, FIG. 1 is a diagram of a display 100 having a red green blue pixel format. A pixel 101 includes a red pixel R, a green pixel G, and a blue pixel B. Accordingly, image data supplied to a color display is often in red green blue format (RGB), containing red, green, and blue data components for each pixel 101. The transmission of image data in RGB format to a display consumes a set number of bits per color. For example, with 8-bit color, 8 bits are required for each of the 3 colors resulting in 24 bits of data per pixel.

The above information disclosed in this Background section is only for enhancement of understanding of the background of the invention, and therefore it may contain information that does not form the prior art that is already known to a person of ordinary skill in the art.

SUMMARY

In one aspect of the present disclosure, a display system is provided. The display system includes a display having a plurality of sub-pixels arranged in a sub-pixel format, and having a line of sub-pixels of the plurality of sub-pixels with a display-line sub-pixel color order, a source configured to generate image data for a line of an image to be displayed on the line of sub-pixels and convert the image data for the line of the image into sub-pixel formatted data having a first sub-pixel color order, and a display device, the source being configured to transmit the sub-pixel formatted data having the first sub-pixel color order to the display device, the display device being configured to convert the sub-pixel formatted data having the first sub-pixel color order into sub-pixel formatted data having a second sub-pixel color order different from the first sub-pixel color order, and to transmit the sub-pixel formatted data having the second sub-pixel color order to the display for rendering on the line of sub-pixels.

In one embodiment, converting the image data for the line into sub-pixel formatted data having the first sub-pixel color order is converting the image data for the line into sub-pixel formatted data having a set sub-pixel color order, and converting the sub-pixel formatted data having the first sub-pixel color order into sub-pixel formatted data having the second sub-pixel color order is determining whether the set sub-pixel color order corresponds to the display-line sub-pixel color order, and upon determining that the set sub-pixel color order does not correspond to the display-line sub-pixel color order, converting the sub-pixel formatted data having the first sub-pixel color order to sub-pixel formatted data having a sub-pixel color order corresponding to the display-line sub-pixel color order.

In one embodiment, the source is configured to compress the sub-pixel formatted data having the set sub-pixel color order, and the display device is further configured to decompress the sub-pixel formatted data having the set sub-pixel color order.

In one embodiment, determining whether the set sub-pixel color order corresponds to the display-line sub-pixel color order is determining whether the line of sub-pixels is an even-numbered line.

In one embodiment, the sub-pixel format is a red-green-blue-green sub-pixel format, the set sub-pixel color order is red-green-blue-green, and converting the sub-pixel formatted data having the first sub-pixel color order to sub-pixel formatted data having the sub-pixel color order is converting the sub-pixel formatted data to a blue-green-red-green sub-pixel color order.

In one embodiment, converting the image data for the line into sub-pixel formatted data having the first sub-pixel color order is converting the image data for the line into sub-pixel formatted data having a sub-pixel color order based on the display-line sub-pixel color order for the line of the display corresponding to the line of the image.

In one embodiment, the source is configured to transmit an indicator corresponding to the line of the image to be displayed in association with the sub-pixel formatted data with the first sub-pixel color order.

In one embodiment, converting the sub-pixel formatted data having the first sub-pixel color order into sub-pixel formatted data having the second sub-pixel color order comprises determining that the indicator does not correspond to a display-line sub-pixel color order for a current line, and converting the sub-pixel formatted data having the first sub-pixel color order into sub-pixel formatted data having a color order corresponding to the display-line sub-pixel color order for the current line.

In one embodiment, the first sub-pixel color order is red-green-blue-green, the display-line sub-pixel color order for the line of the display corresponding to the line of the image is red-green-blue-green, and the display-line sub-pixel color order for the current line is blue-green-red-green.

In one embodiment, the display device is configured to set an error flag upon determining that the indicator does not correspond to a display-line sub-pixel color order for a current line.

According to another aspect of the present disclosure, a method for supplying data to a display is provided. The display has a plurality of sub-pixels arranged in a sub-pixel format, and has a line of sub-pixels of the plurality of sub-pixels with a display-line sub-pixel color order. The method includes generating image data for a line of an image to be displayed on the line of sub-pixels, converting the image data for the line of the image into sub-pixel formatted data having a first sub-pixel color order, transmitting the sub-pixel formatted data having the first sub-pixel color order to a display device, converting the sub-pixel formatted data having the first sub-pixel color order into sub-pixel formatted data having a second sub-pixel color order different from the first sub-pixel color order, and transmitting the sub-pixel formatted data having the second sub-pixel color order to the display for rendering on the line of sub-pixels.

In one embodiment, converting the image data for the line into sub-pixel formatted data having the first sub-pixel color order is converting the image data for the line into sub-pixel formatted data having a set sub-pixel color order, and converting the sub-pixel formatted data having the first sub-pixel color order into sub-pixel formatted data having the second sub-pixel color order is determining whether the set sub-pixel color order corresponds to the display-line sub-pixel color order, and upon determining that the set sub-pixel color order does not correspond to the display-line sub-pixel color order, converting the sub-pixel formatted data having the first sub-pixel color order to sub-pixel formatted data having a sub-pixel color order corresponding to the display-line sub-pixel color order.

In one embodiment, the method includes compressing the sub-pixel formatted data having the set sub-pixel color order before transmitting the sub-pixel formatted data to the display device, and decompressing the sub-pixel formatted data having the set sub-pixel color order after transmitting the sub-pixel formatted data to the display device.

In one embodiment, determining whether the set sub-pixel color order corresponds to the display-line sub-pixel color order is determining whether the line of sub-pixels is an even-numbered line.

In one embodiment, the sub-pixel format is a red-green-blue-green sub-pixel format, the set sub-pixel color order is red-green-blue-green, and converting the sub-pixel formatted data having the first sub-pixel color order to sub-pixel formatted data having the sub-pixel color order is converting the sub-pixel formatted data to a blue-green-red-green sub-pixel color order.

In one embodiment, converting the image data for the line into sub-pixel formatted data having the first sub-pixel color order is converting the image data for the line into sub-pixel formatted data having a sub-pixel color order based on the display-line sub-pixel color order for the line of the display corresponding to the line of the image.

In one embodiment, the method includes transmitting an indicator corresponding to the line of the image to be displayed in association with the sub-pixel formatted data with the first sub-pixel color order.

In one embodiment, converting the sub-pixel formatted data having the first sub-pixel color order into sub-pixel formatted data having the second sub-pixel color order comprises determining that the indicator does not correspond to a display-line sub-pixel color order for a current line, and converting the sub-pixel formatted data having the first sub-pixel color order into sub-pixel formatted data having a color order corresponding to the display-line sub-pixel color order for the current line.

In one embodiment, the first sub-pixel color order is red-green-blue-green, the display-line sub-pixel color order for the line of the display corresponding to the line of the image is red-green-blue-green, and the display-line sub-pixel color order for the current line is blue-green-red-green.

In one embodiment, the display device is configured to set an error flag upon determining that the indicator does not correspond to a display-line sub-pixel color order for a current line.

The above and other aspects of the present disclosure will become more apparent to those skilled in the art from the following detailed description of the example embodiments with reference to the accompanying drawings.

DETAILED DESCRIPTION

Figure 1:
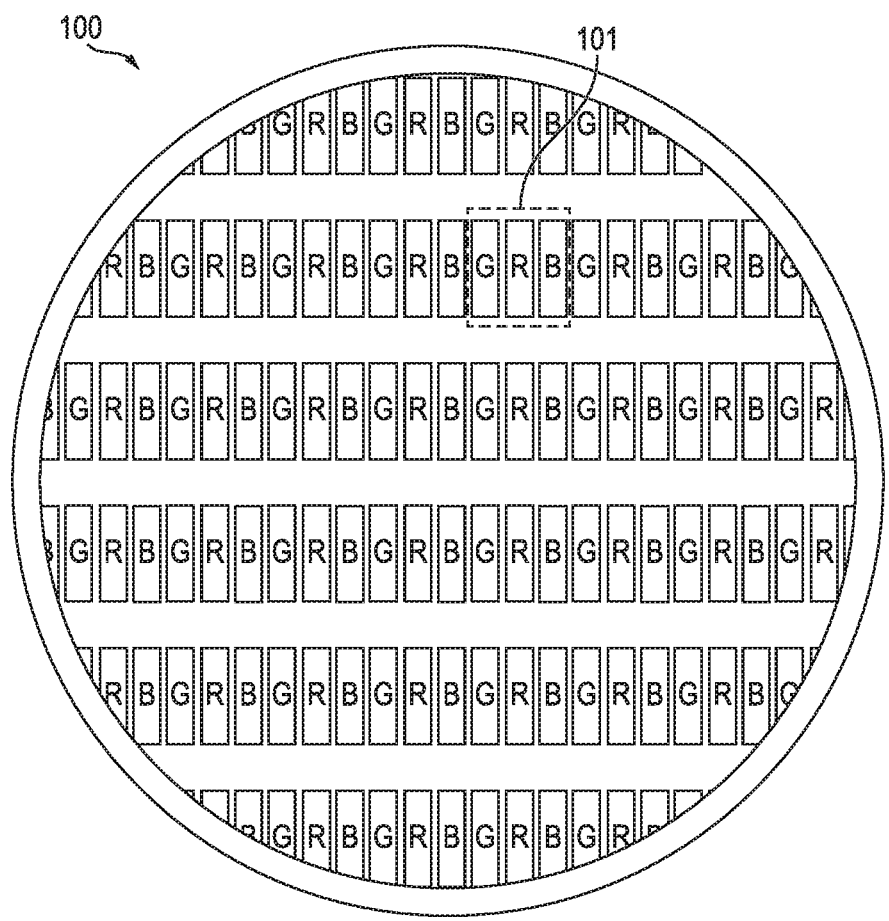
FIG. 1 is a diagram of a display having a red green blue pixel format.

In the following detailed description, only certain exemplary embodiments of the present invention are shown and described, by way of illustration. As those skilled in the art would recognize, the invention may be embodied in many different forms and should not be construed as being limited to the embodiments set forth herein. Descriptions of features or aspects within each exemplary embodiment should typically be considered as available for other similar features or aspects in other exemplary embodiments. Like reference numerals designate like elements throughout the specification.

The present disclosure is generally directed to a display system in which a display device with a sub-pixel formatted display receives sub-pixel formatted data from a directly from a source. The source generates the sub-pixel formatted data with a first pixel color order, and the display device may re-order the sub-pixel formatted data to have a second sub-pixel color order corresponding to the sub-pixel color order of the display.

Figure 2A:
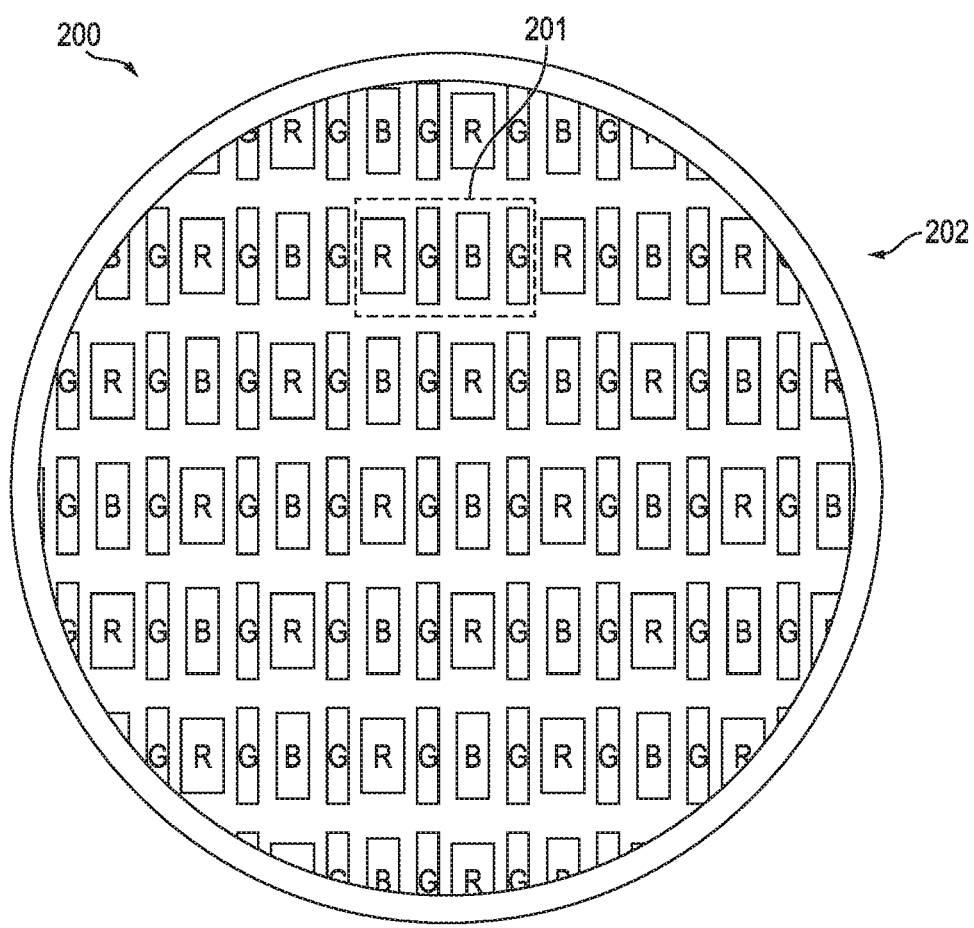
FIG. 2A is a diagram of a display having a red green blue green (RGBG) sub-pixel format according to embodiments of the present disclosure.

Some high-density displays called sub-pixel formatted displays contain fewer colors per pixel than RGB formatted displays. Some sub-pixel displays have 2 sub-pixels per RGB pixel. For example, FIG. 2A is a diagram of a display having a red green blue green (RGBG) sub-pixel format according to embodiments of the present disclosure. The display 200 has a sub-pixel block 201 which includes two green sub-pixels, one red sub-pixel, and one blue sub-pixel for representing two RBG pixels (one less red and one less blue than RGB). As used herein, a sub-pixel color order is the order of the colors of the sub-pixels in a line of a display (e.g., from left to right). The display 200 has a line of pixels 202 having a sub-pixel color order of red-green-blue-green. The lines of the display 200 above and below the line 202 both have a color order of blue green red green, which may prevent the red pixels and/or the blue pixels from forming a vertical line which may improve the quality of the display. Accordingly, different lines of the sub-pixel display 200 may have a different display-line sub-pixel color order.

Figure 2B:
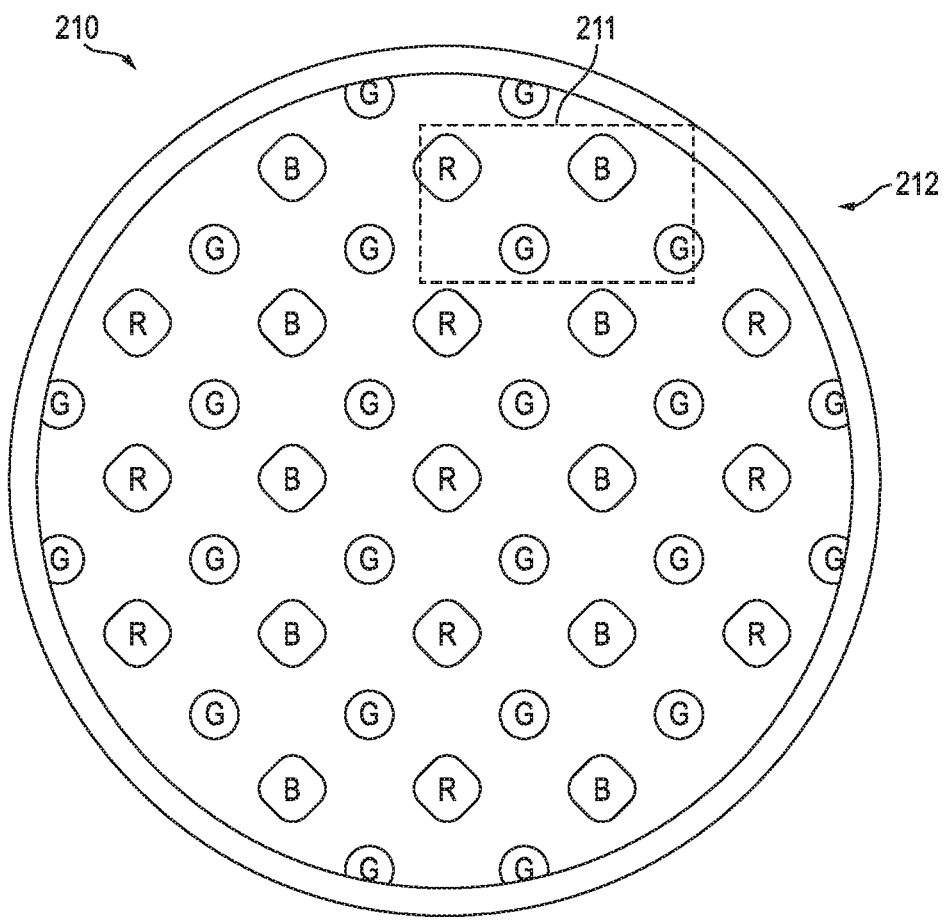
FIG. 2B is a diagram of a display having a red green blue green (RGBG) sub-pixel format in a diamond configuration according to embodiments of the present disclosure.

FIG. 2B is a diagram of a display having a red-green-blue-green (RGBG) sub-pixel format in a diamond configuration according to embodiments of the present disclosure. The display 210 also has a sub-pixel block 211 with two green pixels, one red pixel, and one blue pixel in a line 212 of the display having a sub-pixel color order of red green blue green. The sub-pixels of the display 210 are offset such that the green sub-pixels are not directly between the red sub-pixels and the blue sub-pixels.

Figure 2C:
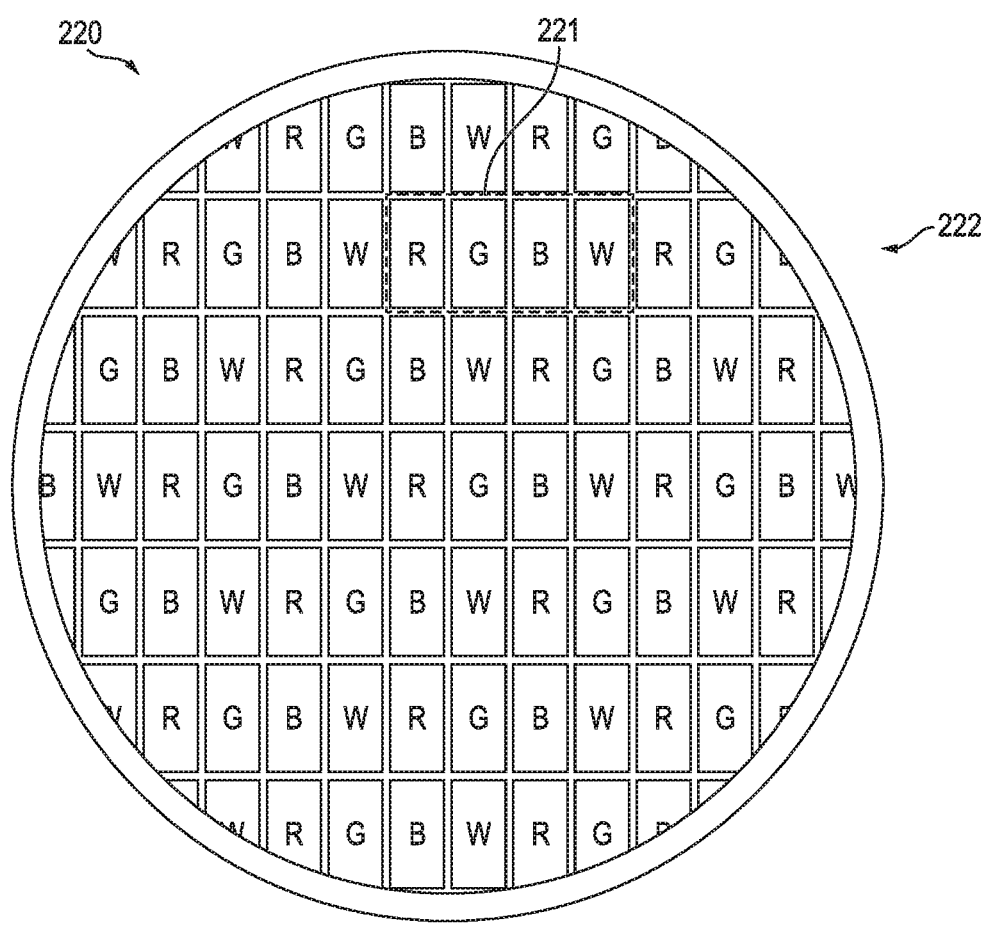
FIG. 2C is a diagram of a display having a red green blue white (RGBW) sub-pixel format according to embodiments of the present disclosure.

FIG. 2C is a diagram of a display having a red-green-blue-white (RGBW) sub-pixel format according to embodiments of the present disclosure. The display 220 includes a sub-pixel block 221 which contains four sub-pixels—a red sub-pixel, a green sub-pixel, a blue sub-pixel, and a white sub-pixel—representative of two RGB pixels. The display line 222 has a sub-pixel color order of red-green-blue-white. The display lines above and below the display line 222 have sub-pixel color orders of blue-white-red-green.

Figure 3:
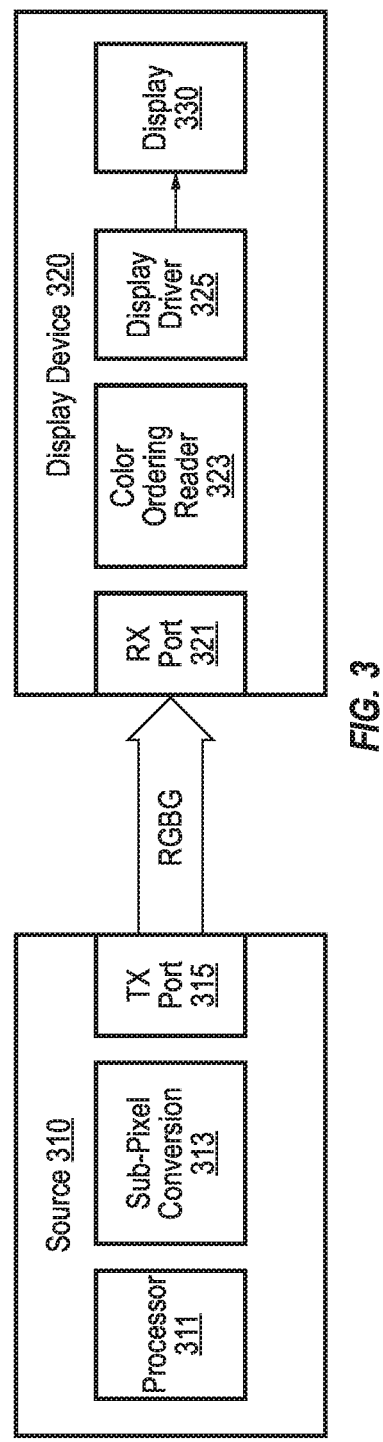
FIG. 3 is a block diagram of a display system according to embodiments of the present disclosure.

FIG. 3 is a block diagram of a display system according to embodiments of the present disclosure. The display system includes a source 310 and a display device 320. The source 310 includes a processor 311, a sub-pixel conversion unit 313, and a transmit port 315. The display module 320 includes a receive port 321, a color reordering reader 323, a display driver 325, and a sub-pixel format display 330.

The processor 311 generates image data in red green blue (RGB) format representative of an image to be rendered on the display 330. In some embodiments, the processor 311 may be a graphics processing unit. In some embodiments, the processor 311 may generate the image data RGB by receiving the image data RGB from an external source, or receiving image or video data and converting it into a series of RGB images.

The sub-pixel conversion unit 313 receives the image data RGB which can be divided up into lines and converts the image data RGB for a line of the image into sub-pixel formatted data for that line. In some embodiments, the sub-pixel format is red-green-blue-green. In some embodiments, the sub-pixel format is red-green-blue-white. Herein, for purposes of illustration, the sub-pixel format will be described as RGBG, and the sub-pixel formatted data will use the reference indicator RGBG; however, other sub-pixel formats are contemplated and the present disclosure should not be considered to be limited to RGBG sub-pixel formats. The source 310 sends the sub-pixel formatted data RGBG for the line of the image from the transmit port 315 to the receive port 321 of the display device 320. In some embodiments, the transmit port 315 and the receive port 321 are display interface ports, e.g. DisplayPort ports.

Each line of the image corresponds to a line of sub-pixels of the display 330 which is intended to render the line of the image. The color reordering reader 323 of the display device 320 retrieves the sub-pixel formatted data RGBG for a line of the image and may reorder the sub-pixel color order of the data, for example to match the sub-pixel color order of the corresponding line of the display 330. The display driver 325 receives the reordered sub-pixel formatted data for the line of the image and drives the display 330 such that the reordered sub-pixel formatted data is displayed on the intended line of the display.

Figure 4:
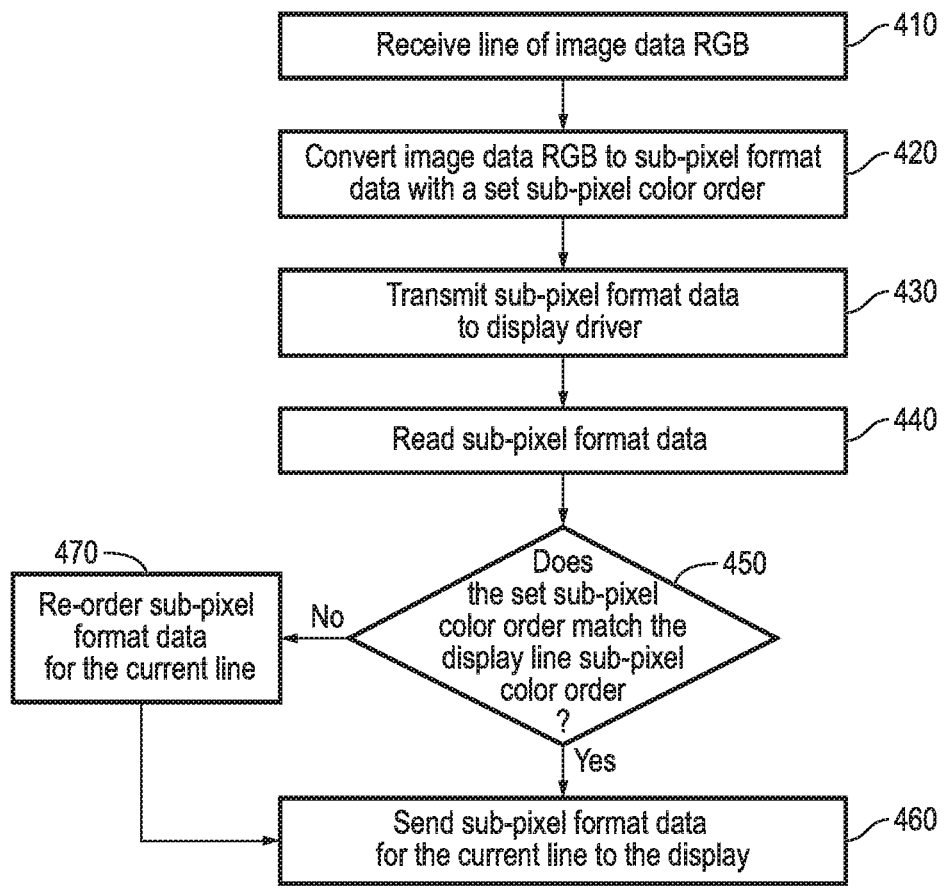
FIG. 4 is a flow chart depicting a method of sending image data to a sub-pixel format display according to embodiments of the present disclosure.

FIG. 4 is a flow chart depicting a method of sending image data to a sub-pixel format display according to embodiments of the present disclosure. At block 410, a line of image data in RGB format is received. At block 420, the image data RGB for the line is converted into sub-pixel formatted data with a set sub-pixel color order. For example, the sub-pixel format display may use the RGBG sub-pixel format, where the colors of the sub-pixels from left to right are red-green-blue-green for even lines and blue-green-red-green for odd lines. The sub-pixel formatted data having a set sub-pixel color order may have the same sub-pixel color order for each line of the image, regardless of the sub-pixel color order of the display.

At block 430, the sub-pixel formatted data for the line, with the set sub-pixel color order, may be transmitted to a display device including a display driver. In some embodiments, the sub-pixel formatted data is transmitted to the display device using the MIPI Alliance Display Serial Interface (MIPI DSI) standard. In other embodiments, the sub-pixel formatted data is transmitted using the Embedded DisplayPort (eDP) standard.

Figure 5:
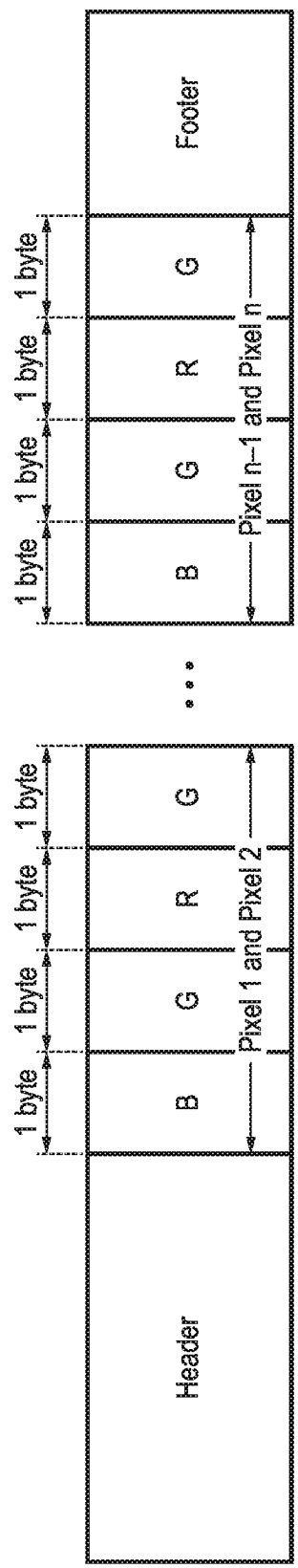
FIG. 5 is a diagram of an image data packet according to embodiments of the present disclosure.

For example, FIG. 5 is a diagram of an image data packet according to embodiments of the present disclosure. The packet of FIG. 5 may be a MIPI DSI packet. The packet includes a header which may contain information about the payload and/or error correction bits, and a footer which may contain a checksum. The packet payload contains the sub-pixel formatted data for one line of the display with the set color order-here, blue-green-red-green. The red green blue image data RGB may contain information for n pixels in a given line. The image data RGB for pixel 1 and pixel 2 is converted into a blue sub-pixel data, a green sub-pixel data, a red sub-pixel data, and another green sub-pixel data, in that order. This is repeated for each pair of pixels in the line of the image up to pixel n−1 and pixel n. Each packet transmitted to the display device will have the same blue-green-red-green color order, regardless of the sub-pixel color order of the line of the display which will output the line.

Referring again to FIG. 4, at block 440, the display device receives the image data packet and reads the sub-pixel formatted data with the first sub-pixel color order from the packet. At block 450, the display device determines whether the set sub-pixel color order matches the sub-pixel color order for the line of the display on which the sub-pixel formatted data will be rendered. For example, in some embodiments, the even lines of the display have a blue-green-red-green color order, the odd lines have a red-green-blue-green color order, and the set sub-pixel color order may be blue-green-red-green. The display device may determine whether the line of the image corresponding to the sub-pixel data will be displayed on an even line or an odd line of the display. If it will be displayed on an even line, the display device may determine that the set sub-pixel color order does match the display line sub-pixel color order. If it will be displayed on an odd line, the display device may determine that the set sub-pixel color order does not match the display line sub-pixel color order. If the two color orders match, the sub-pixel formatted data may be applied to the display at block 460 without changing its sub-pixel color order. If the two color orders do not match, the sub-pixel formatted data having the set sub-pixel color order is re-ordered at block 470 to match the display line sub-pixel color order. The re-ordered sub-pixel formatted data may then be applied to the display at block 460.

Figure 6:
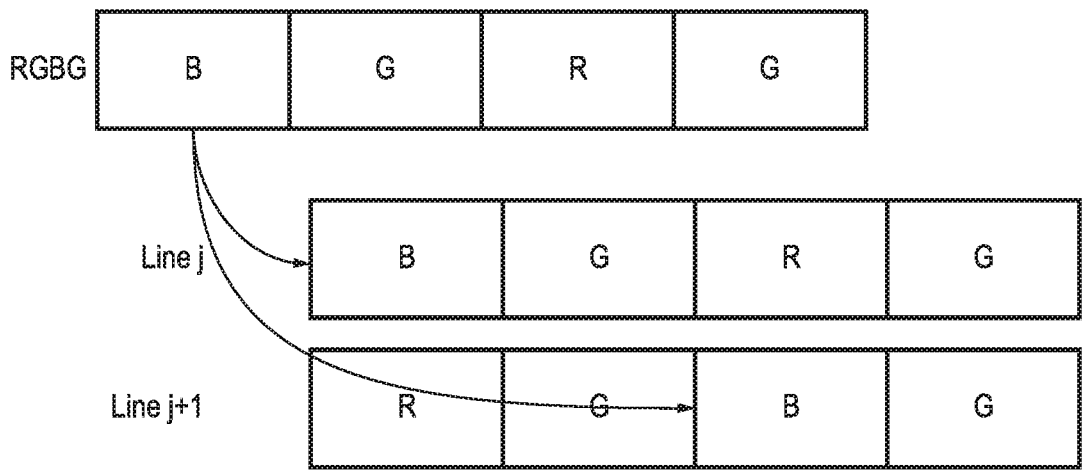
FIG. 6 is a diagram depicting the conversion of sub-pixel formatted data from a first sub-pixel color order to a second sub-pixel color order according to embodiments of the present disclosure.

FIG. 6 is a diagram depicting the conversion of sub-pixel formatted data from a first sub-pixel color order to a second sub-pixel color order according to embodiments of the present disclosure. The sub-pixel formatted data received from the source includes blocks of sub-pixel formatted data representative of two RGB pixels of an image that have a set sub-pixel color order of blue-green-red-green. The sub-pixels of line j of a display also have a blue-green-red-green color order. The sub-pixels of line j+1 of the display have a red-green-blue-green color order. When converting the sub-pixel formatted data having the set color order into sub-pixel formatted data for line j, the display device may not change the color order. When converting the sub-pixel formatted data having the set color order into sub-pixel formatted data for line j+1, the display device may switch the positions of the blue sub-pixel data and the red sub-pixel data.

Figure 7:
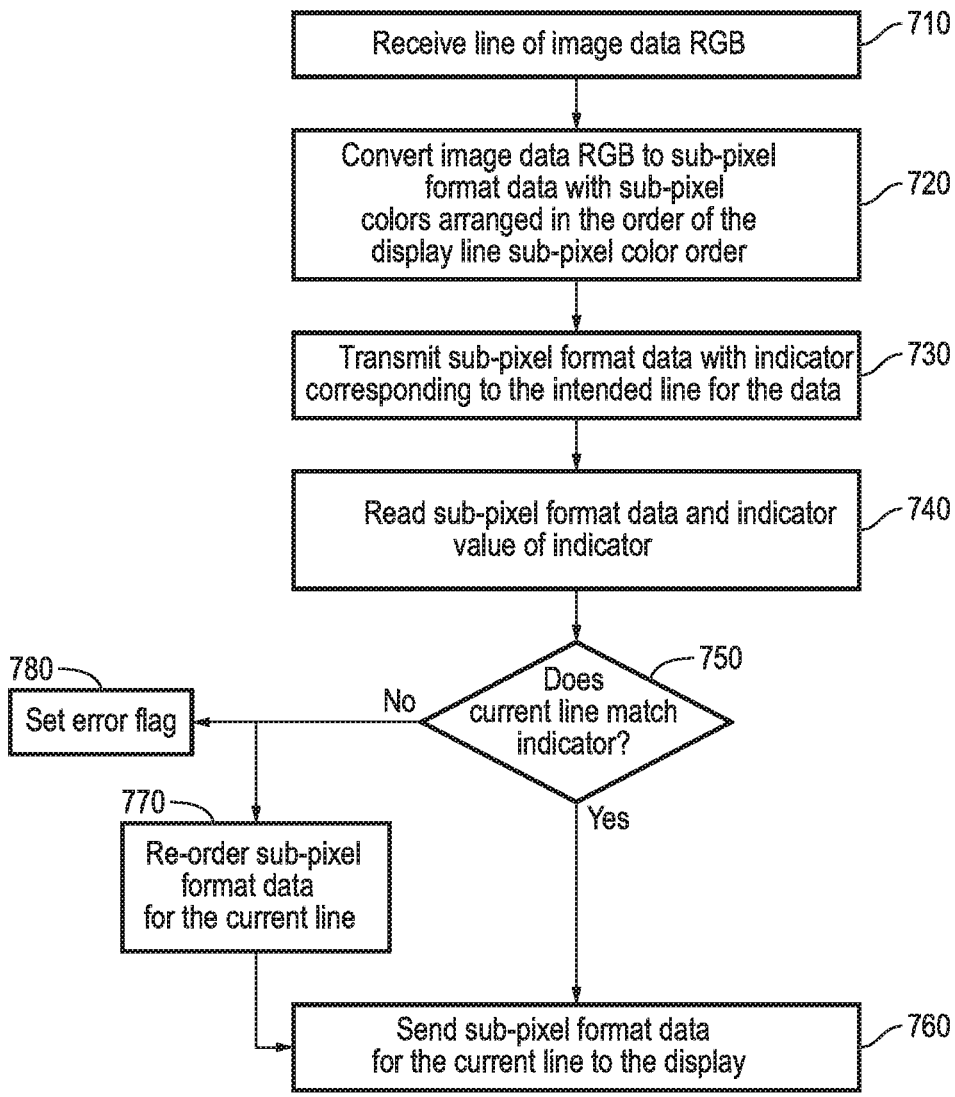
FIG. 7 is a flow chart depicting a method of sending image data to a sub-pixel format display according to embodiments of the present disclosure.

FIG. 7 is a flow chart depicting a method of sending image data to a sub-pixel format display according to embodiments of the present disclosure. At block 710, a line of image data in RGB format is received. The line of the sub-pixel formatted display which will display the line of image data RGB has a display-line sub-pixel color order. At block 720, the image data RGB for the line is converted into sub-pixel format having a sub-pixel color order corresponding to the display-line sub-pixel color order.

At block 730, the sub-pixel formatted data for the line having the sub-pixel color order corresponding to the display line sub-pixel color order is transmitted to a display device. In some embodiments, an indicator of the display line or display lines corresponding to the sub-pixel formatted data is transmitted to the display device along with the sub-pixel formatted data for the line. In some embodiments, the value of the indicator identifies the sub-pixel color order of the sub-pixel formatted data. In some embodiments, the value of the indicator identifies which line of the display the sub-pixel formatted data is intended for. In some embodiments, the value of the indicator identifies whether the sub-pixel formatted data is for an even line or for an odd line of the display. The sub-pixel formatted data may be transmitted in a payload of a packet, and the indicator may be in the header of the packet. In some embodiments, the sub-pixel formatted data is transmitted to the display device using the MIPI DSI standard, and the virtual channel bits of the header can be used as the indicator.

Figure 8:
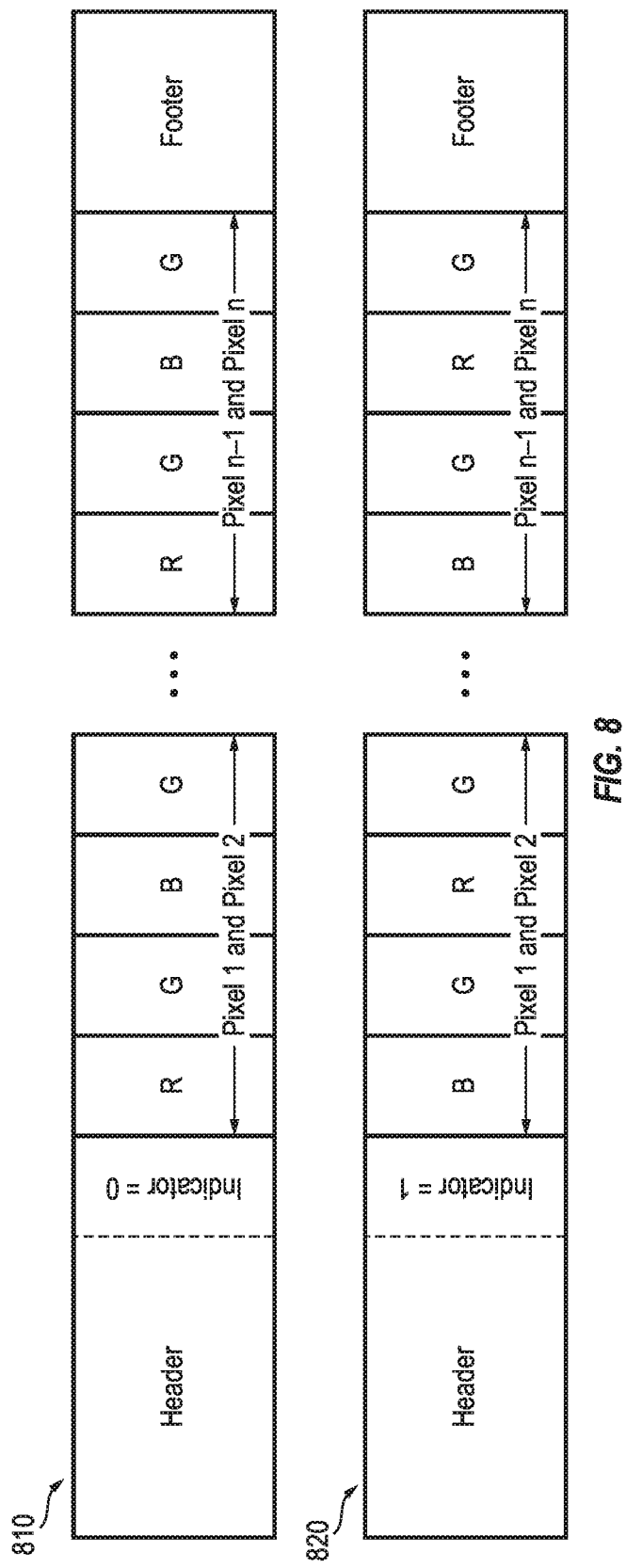
FIG. 8 is a diagram of first and second image data packet formats according to embodiments of the present disclosure

For example, FIG. 8 is a diagram of a first image data packet format 810 and a second image data packet format 820 according to embodiments of the present disclosure. The first image data packet format 810 includes an indicator with a value of 0 in its header, and has a sub-pixel color order of red-green-blue-green. The second image data packet format 820 has an indicator with a value of 1 in its header, and has a sub-pixel color order of blue-green-red-green. A sub-pixel formatted display may include even-numbered lines with a sub-pixel color order of red-green-blue-green, and odd-numbered lines with a sub-pixel color order of blue-green-red-green. When converting image data RGB for a line of an image into sub-pixel formatted data to be displayed on an even-numbered line of the display, the source may use the first image data packet format 810. When converting image data RGB for a line of an image into sub-pixel formatted data to be displayed on an odd-numbered line of the display, the source may use the second image data packet format 820.

Referring again to FIG. 7, at block 740, the display device receives the image data packet and reads the sub-pixel formatted data and the value of the indicator from the packet. At block 750, the display device determines whether the value of the indicator corresponds to the line of the display which will receive the sub-pixel formatted data, indicating that the sub-pixel color order of the sub-pixel formatted data matches the display-line sub-pixel color order. For example, with respect to the example of FIG. 8 discussed above, the display device may determine whether the value of the indicator is 0 when the line of the display is even-numbered, or whether the value of the indicator is 1 when the line of the display is odd-numbered. Referring again to FIG. 7, if the display device determines that value of the indicator corresponds to the line of the display, the sub-pixel formatted data may be applied to the line of the display at block 760 without changing its sub-pixel color order. In some embodiments, if the display device determines that the value of the indicator does not correspond to the line of the display, e.g. indicating that the sub-pixel color order of the sub-pixel formatted data does not match the display-line sub-pixel color order, an error flag may be set at block 780 indicating that the source is out of sync with the display devices. Upon setting the error flag, the display device may stop rendering the image, may not render the individual line of the image but may continue attempting to render the remainder of the image, or may stop operation. In some embodiments, if the display device determines that the value of the indicator does not correspond to the line of the display, the display device may re-order the sub-pixel formatted data to have a color order match the display line sub-pixel color order, and may apply the re-ordered sub-pixel formatted data to the line of the display at block 760.

In one embodiment of the present disclosure, the image data RGB is converted into sub-pixel formatted data having a sub-pixel color order corresponding to the display line sub-pixel color order, and the sub-pixel formatted data is transmitted to the display device without an indicator, and the display device applies the sub-pixel formatted data to the line of the display without matching the sub-pixel color order with the display-line sub-pixel color order.

Figure 9:
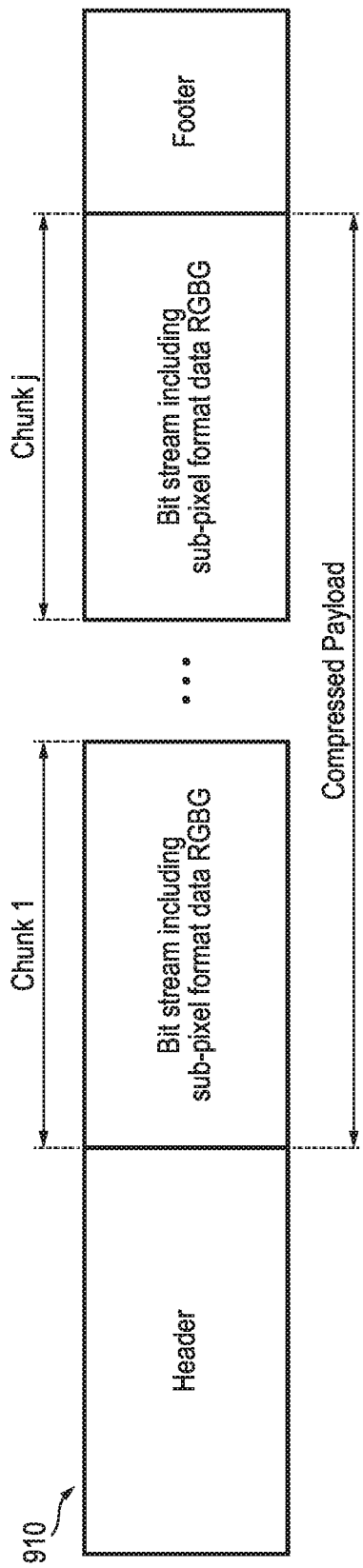
FIG. 9 is a diagram of an image data packet utilizing a compressed bit stream according to embodiments of the present disclosure.

FIG. 9 is a diagram of an image data packet utilizing a compressed bit stream according to embodiments of the present disclosure. In some embodiments, the source compresses the sub-pixel formatted data. The source may create an image data packet 910 with a compressed payload containing a bit stream of compressed sub-pixel formatted data and may transmit the image data packet 910 to the display device 320. The display device 320 may extract the bit stream, and may decompress the bit stream to obtain the sub-pixel formatted data. In some embodiments, the sub-pixel conversion unit 313 may reorder the sub-pixel formatted data to have a set sub-pixel color order prior to compressing the sub-pixel formatted data, and the color ordering reader 323 may determine whether the set sub-pixel color order matches the display line sub-pixel color order after the sub-pixel formatted data has been decompressed, for example as discussed above with respect to FIG. 4. In some embodiments, the sub-pixel conversion unit 313 may include an indicator corresponding to the intended line for the data, either in the uncompressed header of the image data packet 910 or in the compressed payload, for example as discussed above with respect to FIG. 7.

Figure 10:
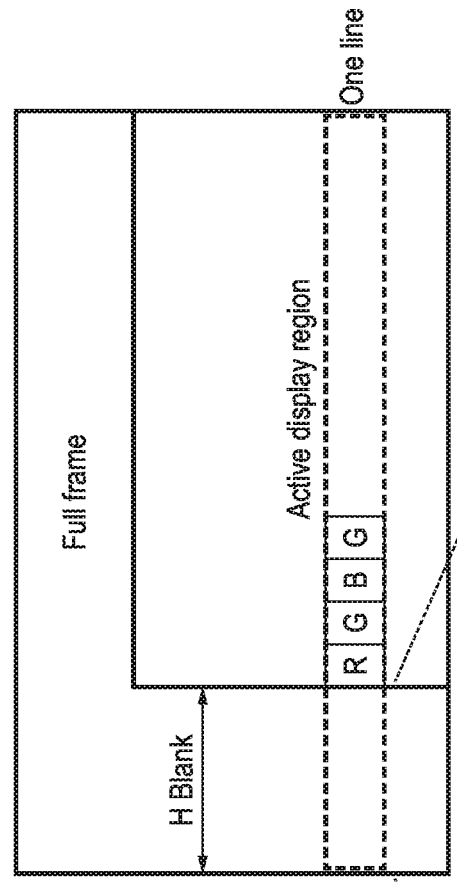
FIG. 10 is a diagram depicting the display of a line of sub-pixel formatted data on a display according to embodiments of the present disclosure.

FIG. 10 is a diagram depicting the display of a line of sub-pixel formatted data on a display according to embodiments of the present disclosure. Referring to FIG. 10, the source may communicate the sub-pixel formatted data to the display device utilizing the embedded DisplayPort (eDP) standard. The sub-pixel formatted data can be transmitted in the active display region. An indicator representative of the sub-pixel color order of the sub-pixel formatted data, or corresponding to an intended line for the sub-pixel color formatted data, can be transmitted in the H Blank period before the pixels in the active display region. For example, the indicator can be in the VB-ID portion of the eDP packet.

The eDP VB-ID is similar to the MIPI packet header in that it contains information about the display line and could be modified from the existing implementations to manage the signalling of the sub sampled pixel order, for example as described above with respect to FIG. 5 where the sub pixel data remains in the same order and is switched in the receiver by a metadata indicator or as described above with respect to FIG. 6 where the sub sampled pixel data is in the proper order for all lines and the metadata indicator that would be in the VB-ID is a indescribed for the MIP DSI verifies the sub sampled pixel order for the line in transmission.

Figure 11:
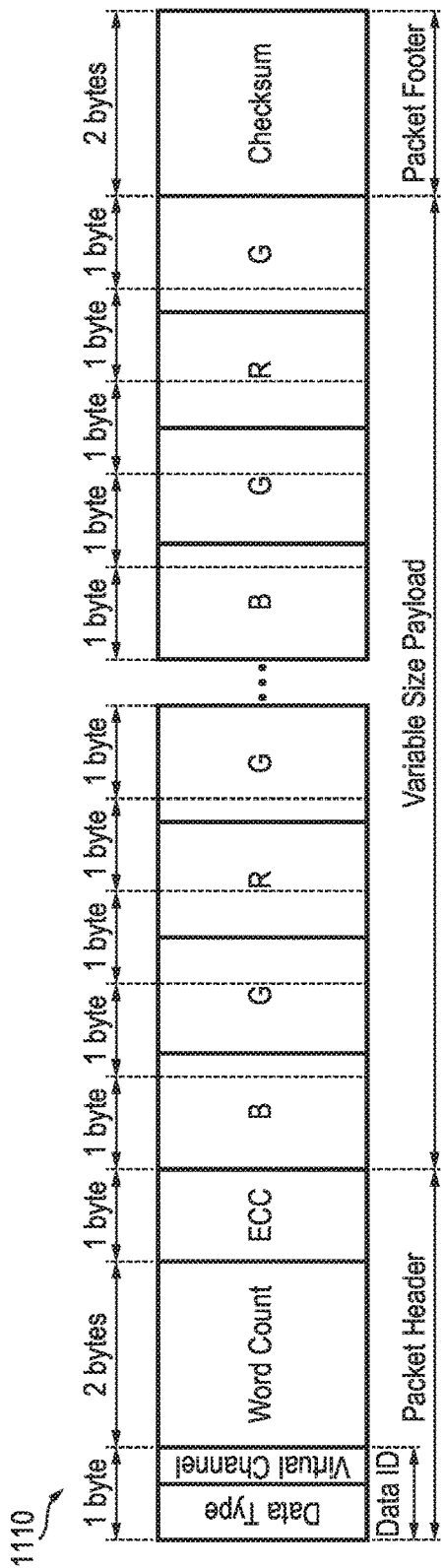
FIG. 11 is a diagram of an image data packet including 10 bit color depth according to embodiments of the present disclosure.

FIG. 11 is a diagram of an image data packet including 10 bit color depth according to embodiments of the present disclosure. In some embodiments, the source 310 transmits the sub-pixel formatted data to the display device 320 utilizing an image data packet 1110, where each sub-pixel color includes 10 bits of data. One block with four sub-pixels representing two RGB pixels, such as a RGBG formatted block, includes 5 bytes in the payload, or 40 bits. Accordingly, the transmission between the source 310 and the display device 320 requires lower bandwidth than transmitting RGB image data with a 10 bit color depth between the source 310 and the display device 320, which would require 7.5 bytes or 60 bits for the corresponding two RGB pixels.

Figure 12:
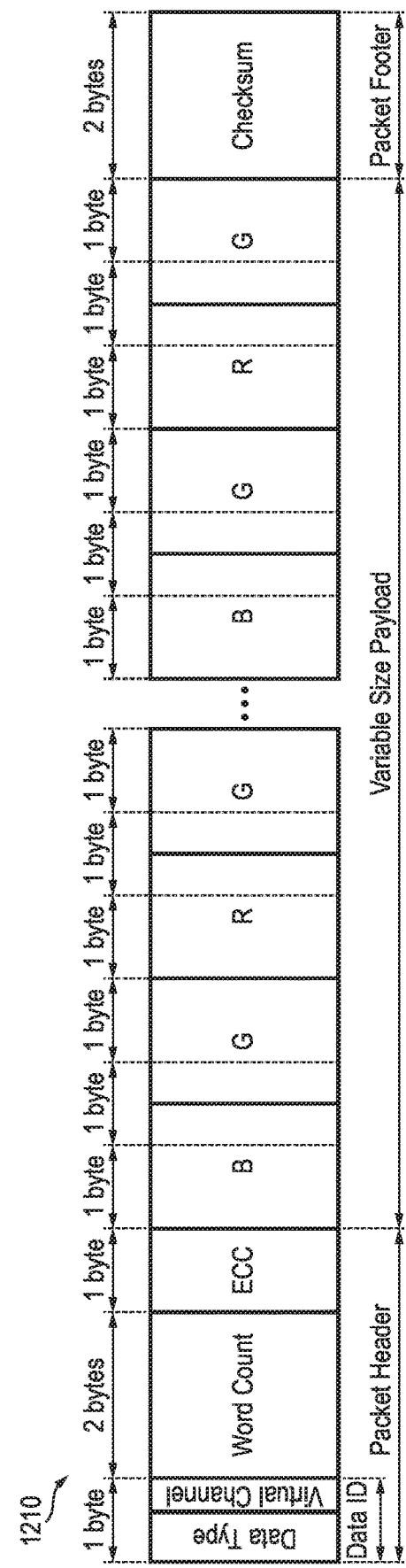
FIG. 12 is a diagram of an image data packet including 12 bit color depth according to embodiments of the present disclosure.

FIG. 12 is a diagram of an image data packet including 12 bit color depth according to embodiments of the present disclosure. In some embodiments, the source 310 transmits the sub-pixel formatted data to the display device 320 utilizing an image data packet 1210, where each sub-pixel color includes 12 bits of data. One block with four sub-pixels representing two RGB pixels, such as a RGBG formatted block, includes 6 bytes in the payload, or 60 bits. Accordingly, the transmission between the source 310 and the display device 320 requires lower bandwidth than transmitting RGB image data with a 12 bit color depth between the source 310 and the display device 320, which would require 9 bytes or 72 bits for the corresponding two RGB pixels.

In other embodiments, other bit length color depths can be used in accordance with the present disclosure. When the sub-pixel formatted data is received, the position of data for a sub-pixel is kept or swapped at the sub-pixel level as an atomic unit.

In the drawings, the relative sizes of elements, layers, and regions may be exaggerated and/or simplified for clarity. Spatially relative terms, such as "beneath," "below," "lower," "under," "above," "upper," and the like, such as describing lines of a display "above" or "below" a line, or pixels "left" or "right" of other pixels, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

The terminology used herein is for the purpose of describing particular embodiments and is not intended to be limiting of the present invention. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

The electronic or electric devices and/or any other relevant devices or components according to embodiments of the present invention described herein, such as the source and/or the display device, may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

What is claimed is:

1. A display system comprising:
a display device comprising a display having a plurality of sub-pixels arranged in a sub-pixel format, and having a line of sub-pixels of the plurality of sub-pixels with a display-line sub-pixel color order;
a source configured to generate image data in red-green-blue format for a line of an image to be displayed on the line of sub-pixels and convert the image data in red-green-blue format for the line of the image into sub-pixel formatted data having a first sub-pixel color order;
the source being external to the display device and configured to transmit the sub-pixel formatted data having the first sub-pixel color order to the display device, the display device being configured to convert the sub-pixel formatted data having the first sub-pixel color order into sub-pixel formatted data having a second sub-pixel color order different from the first sub-pixel color order and the image data in red-green-blue format generated by the source, and to transmit the sub-pixel formatted data having the second sub-pixel color order to the display for rendering on the line of sub-pixels.

2. The display system of claim 1, wherein:
converting the image data for the line into sub-pixel formatted data having the first sub-pixel color order is converting the image data for the line into sub-pixel formatted data having a set sub-pixel color order, and
converting the sub-pixel formatted data having the first sub-pixel color order into sub-pixel formatted data having the second sub-pixel color order is determining whether the set sub-pixel color order corresponds to the display-line sub-pixel color order, and upon determining that the set sub-pixel color order does not correspond to the display-line sub-pixel color order, converting the sub-pixel formatted data having the first sub-pixel color order to sub-pixel formatted data having a sub-pixel color order corresponding to the display-line sub-pixel color order.

3. The display system of claim 2, wherein the source is further configured to compress the sub-pixel formatted data having the set sub-pixel color order, and wherein the display device is further configured to decompress the sub-pixel formatted data having the set sub-pixel color order.

4. The display system of claim 2, wherein determining whether the set sub-pixel color order corresponds to the display-line sub-pixel color order is determining whether the line of sub-pixels is an even-numbered line.

5. The display system of claim 2, wherein the sub-pixel format is a red-green-blue-green sub-pixel format, the set sub-pixel color order is red-green-blue-green, and converting the sub-pixel formatted data having the first sub-pixel color order to sub-pixel formatted data having the second sub-pixel color order is converting the sub-pixel formatted data to a blue-green-red-green sub-pixel color order.

6. The display system of claim 1, wherein:
converting the image data for the line into sub-pixel formatted data having the first sub-pixel color order is converting the image data for the line into sub-pixel formatted data having a sub-pixel color order based on the display-line sub-pixel color order for the line of the display corresponding to the line of the image.

7. The display system of claim 6, wherein the source is configured to transmit an indicator corresponding to the line of the image to be displayed in association with the sub-pixel formatted data with the first sub-pixel color order.

8. The display system of claim 7, wherein converting the sub-pixel formatted data having the first sub-pixel color order into sub-pixel formatted data having the second sub-pixel color order comprises determining that the indicator does not correspond to a display-line sub-pixel color order for a current line, and converting the sub-pixel formatted data having the first sub-pixel color order into sub-pixel formatted data having a color order corresponding to the display-line sub-pixel color order for the current line.

9. The display system of claim 8, wherein the first sub-pixel color order is red-green-blue-green, the display-line sub-pixel color order for the line of the display corresponding to the line of the image is red-green-blue-green, and the display-line sub-pixel color order for the current line is blue-green-red-green.

10. The display system of claim 7, wherein the display device is configured to set an error flag upon determining that the indicator does not correspond to a display-line sub-pixel color order for a current line.

11. A method for supplying data to a display device comprising a display having a plurality of sub-pixels arranged in a sub-pixel format, and having a line of sub-pixels of the plurality of sub-pixels with a display-line sub-pixel color order, the method comprising:
generating, by a source external to the display device, image data in red-green-blue format for a line of an image to be displayed on the line of sub-pixels;
converting, by the source external to the display device, the image data in red-green-blue format for the line of the image into sub-pixel formatted data having a first sub-pixel color order;
transmitting, by the source external to the display device, the sub-pixel formatted data having the first sub-pixel color order to the display device;
converting, by the display device, the sub-pixel formatted data having the first sub-pixel color order into sub-pixel formatted data having a second sub-pixel color order different from the first sub-pixel color order and the image data in red-green-blue format generated by the source; and
transmitting, by the display device, the sub-pixel formatted data having the second sub-pixel color order to the display for rendering on the line of sub-pixels.

12. The method of claim 11, wherein:
converting the image data for the line into sub-pixel formatted data having the first sub-pixel color order is converting the image data for the line into sub-pixel formatted data having a set sub-pixel color order, and
converting the sub-pixel formatted data having the first sub-pixel color order into sub-pixel formatted data having the second sub-pixel color order is determining whether the set sub-pixel color order corresponds to the display-line sub-pixel color order, and upon determining that the set sub-pixel color order does not correspond to the display-line sub-pixel color order, converting the sub-pixel formatted data having the first sub-pixel color order to sub-pixel formatted data having a sub-pixel color order corresponding to the display-line sub-pixel color order.

13. The method of claim 12, further comprising:
compressing the sub-pixel formatted data having the set sub-pixel color order before transmitting the sub-pixel formatted data to the display device; and
decompressing the sub-pixel formatted data having the set sub-pixel color order after transmitting the sub-pixel formatted data to the display device.

14. The method of claim 12, wherein determining whether the set sub-pixel color order corresponds to the display-line sub-pixel color order is determining whether the line of sub-pixels is an even-numbered line.

15. The method of claim 12, wherein the sub-pixel format is a red-green-blue-green sub-pixel format, the set sub-pixel color order is red-green-blue-green, and converting the sub-pixel formatted data having the first sub-pixel color order to sub-pixel formatted data having the sub-pixel color order is converting the sub-pixel formatted data to a blue-green-red-green sub-pixel color order.

16. The method of claim 11, wherein:
converting the image data for the line into sub-pixel formatted data having the first sub-pixel color order is converting the image data for the line into sub-pixel formatted data having a sub-pixel color order based on the display-line sub-pixel color order for the line of the display corresponding to the line of the image.

17. The method of claim 16, further comprising transmitting an indicator corresponding to the line of the image to be displayed in association with the sub-pixel formatted data with the first sub-pixel color order.

18. The method of claim 17, wherein converting the sub-pixel formatted data having the first sub-pixel color order into sub-pixel formatted data having the second sub-pixel color order comprises determining that the indicator does not correspond to a display-line sub-pixel color order for a current line, and converting the sub-pixel formatted data having the first sub-pixel color order into sub-pixel formatted data having a color order corresponding to the display-line sub-pixel color order for the current line.

19. The method of claim 18, wherein the first sub-pixel color order is red-green-blue-green, the display-line sub-pixel color order for the line of the display corresponding to the line of the image is red-green-blue-green, and the display-line sub-pixel color order for the current line is blue-green-red-green.

20. The method of claim 17, wherein the display device is configured to set an error flag upon determining that the indicator does not correspond to a display-line sub-pixel color order for a current line.

* * * * *